UNITED STATES PATENT OFFICE.

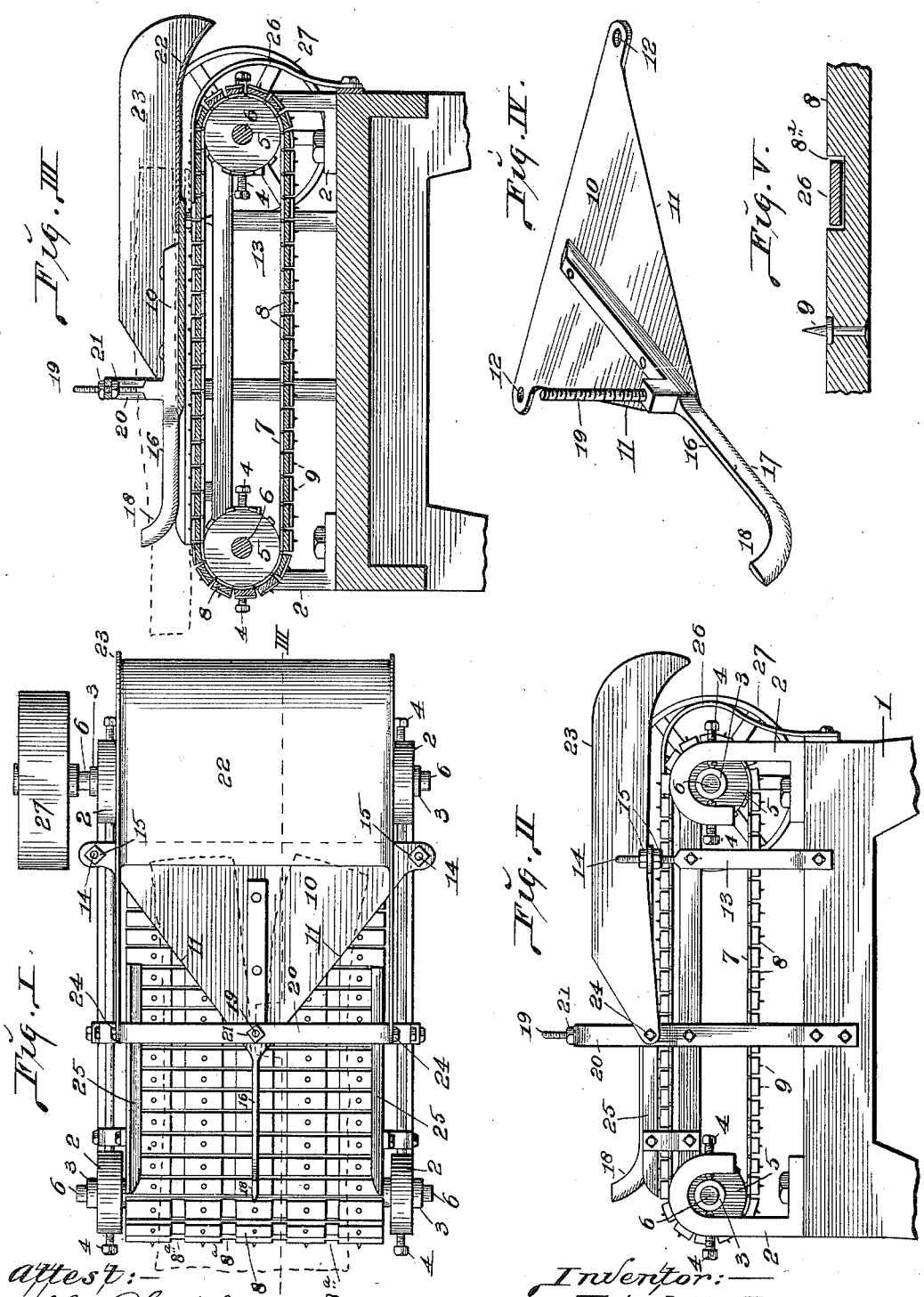

JOSEPH N. BURNO, OF EAST ST. LOUIS, ILLINOIS.

PORK-SKINNING MACHINE.

SPECIFICATION forming part of Letters Patent No. 661,440, dated November 6, 1900.

Application filed July 16, 1900. Serial No. 23,749. (No model.)

*To all whom it may concern:*

Be it known that I, JOSEPH N. BURNO, a citizen of the United States, residing at East St. Louis, in the county of St. Clair, in the State of Illinois, have invented certain new and useful Improvements in Pork-Skinning Machines, of which the following is a full, clear, and exact description, reference being had to the accompanying drawings, forming part of this specification.

My invention relates to a machine for use in removing the skin from that portion of pork known to the trade as "backfat," which is the part of the pork utilized for making lard.

My invention consists in features of novelty hereinafter fully described, and pointed out in the claims.

Figure I is a top or plan view of my improved machine. Fig. II is a view in side elevation. Fig. III is a vertical longitudinal section taken on the line III III, Fig. I. Fig. IV is an enlarged perspective view of the skinning and slitting knives. Fig. V is an enlarged sectional view of one of the endless carrier-slats and one of the throw-off fingers that fit in said slats.

1 designates the frame of the machine, on which are mounted the standards 2, preferably of gooseneck form, as shown in Fig. I. Mounted in the standards 2 are bearing-boxes 3, and 4 are retaining and adjusting screws, through means of which the boxes may be adjusted in either direction longitudinally of the machine to move them nearer together or farther apart.

5 designates sprocket-rollers having shafts 6, that are mounted in the bearing-boxes 3 and are adapted to be moved with said bearing-boxes in their adjustment.

7 designates the chains of an endless carrier provided with slats 8, in each of which are located a series of prongs 9. The endless carrier travels on the sprocket-rollers 5 and is maintained with proper degree of tension upon the adjustment of the bearing-holding screws 4.

10 designates a flat angular skinning-knife provided with two cutting edges 11, said knife being positioned horizontally above the endless carrier and being held at its rear end upon posts 13, having screw-threaded upper ends that pass through openings 12 in the knife 11. The knife is adjustably supported on said posts by adjustment-nuts 15, whereby the rear end of the knife may be moved to or from the endless carrier in obtaining the desired relative position of the parts according to the thickness of the piece of meat to be skinned.

16 designates a slitting-knife having a lower cutting edge 17 and an upturned forward cutting end 18, the shank of said slitting-knife being fixed to the skinning-knife 10 in a central position thereon and extending forwardly from the front end or point of the skinning-knife. The forward end of the skinning-knife 10 and the slitting-knife are adjustably supported by a screw-stem 19, that extends upwardly from the shank of the knife 16 and passes through an arch 20, to which it is held by adjustment-nuts 21, through the medium of which the knives may be adjusted vertically in connection with the posts 13 and adjustment-nuts 15 to cause them to assume the desired position of elevation above the endless carrier.

22 designates an apron having side flanges 23 and pivotally connected at 24 to the arch 20 and extending rearwardly from the skinning-knife 10, from which it is adapted to receive the skinned meat and discharge it from the machine.

25 designates retaining-bars positioned above the ends of the slats of the endless carrier and adapted for service in preventing the buckling of the carrier when the piece of meat is first placed upon the carrier and encountered by the slitting-knife 16.

To provide for the separation of the skin removed from the endless carrier as the slats of the carrier leave the skinning-knife, I employ throw-off fingers 26, that are fixed to the frame 1 of the machine and extend upwardly therefrom over the rear end of the endless carrier, where they are received by grooves $8^a$ in the slats of the endless carrier. (See Figs. III and V.) As the carrier is conveyed around the rear sprocket-roller 5 the fingers 26 loosen and separate the skin into which the prongs 9 of the endless carrier have been embedded and the skin is discharged over the throw-off fingers instead of being carried downwardly with the carrier. Power is applied to operate the machine through the drive-pulley 27, mounted on the shaft 6 of one of the sprocket-rollers 5.

In the practical use of the machine the piece of meat, "backfat," is placed on the endless carrier in front of the curved forward end 18 of the slitting-knife 16, with the skin side down. As the endless carrier moves rearwardly the meat is conveyed thereby and is slit by the knife 16 into two pieces that upon leaving the slitting-knife encounter the angular cutting edges 11 of the skinning-knife 10, the said cutting edges operating to remove the skin from the meat as the body of the meat passes over the skinning-knife onto the apron 22, and the skin is conveyed beneath the knife by the endless carrier.

I claim as my invention—

1. In a machine of the character described, the combination of an angular-shaped skinning-knife, a slitting-knife extending forwardly from the point of said skinning-knife, and means for feeding the meat to be operated upon to said knives, substantially as set forth.

2. In a machine of the character described, the combination of an angular-shaped skinning-knife, a slitting-knife extending forwardly from said skinning-knife and having an upturned forward end, and means for feeding the meat to be operated upon to said knives, substantially as described.

JOSEPH N. BURNO.

In presence of—
GEO. H. KNIGHT,
M. E. LOWE.